United States Patent

[11] 3,594,745

[72] Inventor William M. Nickels
 Englewood, Colo.
[21] Appl. No. 822,931
[22] Filed May 8, 1969
[45] Patented July 20, 1971
[73] Assignee C. A. Norgren Co.
 Littleton, Colo.

[54] VALVE FOR SIGNALING THREE CONDITIONS
 8 Claims, 4 Drawing Figs.
[52] U.S. Cl. .................................................. 340/213.1,
 340/240, 200/82, 116/70, 137/557, 73/419
[51] Int. Cl. ...................................................... G01l 19/12,
 G08b 25/00
[50] Field of Search ..................................... 340/213.1,
 240, 270; 200/82, 83.1; 116/70; 137/557; 235/201 ME

[56] References Cited
 UNITED STATES PATENTS
3,366,758 1/1968 Bentzen et al. ............... 116/70
3,413,951 12/1968 Keil ............................. 116/70
3,474,906 10/1969 Tennis .......................... 116/70
3,499,415 3/1970 Gutkowski .................... 116/70

Primary Examiner—John W. Caldwell
Assistant Examiner—Robert J. Mooney
Attorney—Sheridan, Ross and Burton ABSTRACT: A piston-type valve operated by air or other gas characterized by an input supply port and an input control port to which equal pressures are applied, a first signal output port communicating with the supply port when the control pressure decays below a predetermined value, and a manually operated spool valve moveable to a position for disestablishing communication between the supply port and first signal port and also establishing communication between the supply port and a second signal output port. The first output port may operate an audible annunciator and visible red light which indicates that the control pressure has decayed and the second output port may operate a signal device, such as an amber light, which indicates that an operator has acknowledged receipt of the previous alarm signal. During normal operation, the control pressure may operate a green light only when its pressure is above a predetermined value. The lights thus operate sequentially, green indicating normal control pressure in the system, red indicating a danger condition and amber indicating acknowledgement of the alarm condition. When the control pressure is restored to normal, the valve parts are automatically moved to their original positions.

PATENTED JUL 20 1971
3,594,745
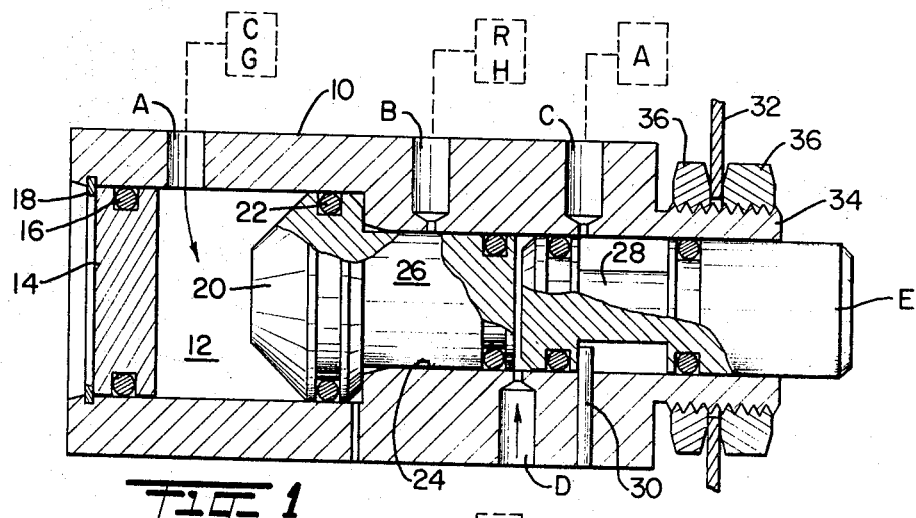
Fig. 1
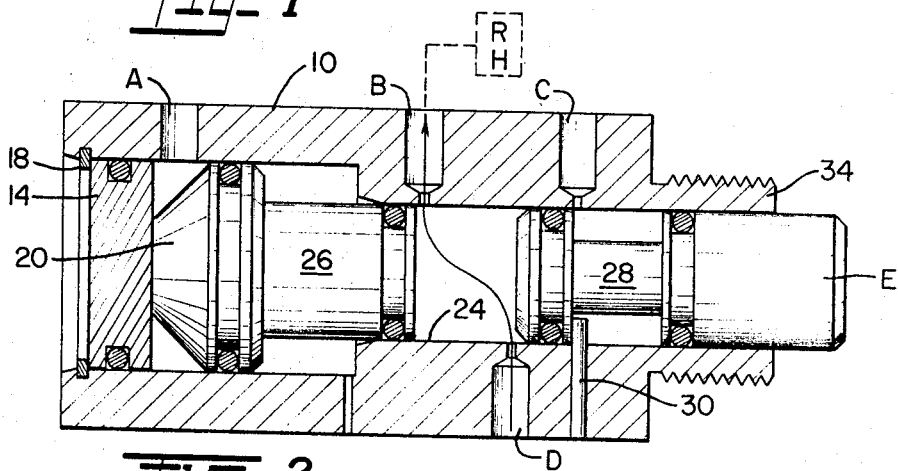
Fig. 2
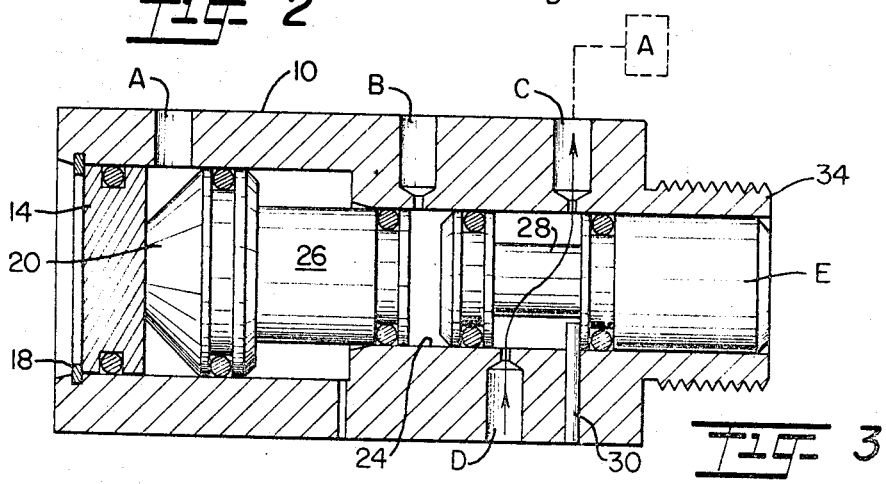
Fig. 3
|        | A | B | C | D | E |
|--------|---|---|---|---|---|
| FIG. 1 | Y | N | N | Y | N |
| FIG. 2 | N | Y | N | Y | N |
| FIG. 3 | N | N | Y | Y | Y |
Fig. 4
INVENTOR
WILLIAM M. NICKELS
BY
Sheridan, Ross + Barton
ATTORNEYS

VALVE FOR SIGNALING THREE CONDITIONS

BACKGROUND OF THE INVENTION

In the art of material processing, it is often necessary to monitor a pneumatic pressure signal and determine its pressure or absence, and particularly if absent, to utilize this information for correcting the condition or manipulating other controls with which it is associated in the overall processing operation. As will be apparent, this is only exemplary of its application in the arts and a myriad of other uses are possible wherever a fluid pressure signal must be monitored. Pressure-monitoring devices are often complex, expensive and subject to malfunction by reason of their complexity. Further, they are often of a type involving electric switching which creates explosion hazards in some environments. To obviate the disadvantages referred to, and others, the principal objectives of the present invention are to provide an explosion-proof pressure-monitoring device which is of simplified construction, foolproof and reliable in operation, and economical of manufacture. Other objectives, advantages and salient features will become more apparent from the description to follow, the appended claims, and the accompanying drawing.

SUMMARY OF THE INVENTION

A pressure-responsive slideable piston having a large area at one end subjected to control pressure, and a smaller area at the other end subjected to supply pressure, moves the piston to a normal position when the control pressure equals the supply pressure. When the control pressure decays, however, the supply pressure moves the piston to a second opposite position in which supply pressure operates a first signal device. A manually moveable spool valve may then be depressed, rerouting the supply pressure to a second signal device. When the control pressure is restored to its normal position, returning the manually operated spool valve to its normal position.

The piston, spool valve and input and output ports perform the logic functions of a flip-flop and a NOT. As a flip-flop, the spool valve remains in its normal position with no output to the second signal device until it is manually depressed to a second position. After depressing it, an output signal will remain at the second signal device provided that control pressure has not been restored. As a NOT, the pressure-sensing piston remains in its normal position so long as control pressure is adequate and does not permit an output signal at the first signal device. The device functions as a three-position valve except that it bypasses a center position on its return stroke. Thus, in a first and normal position of parts there is no output at either of the output ports, in a second position there is an output at only one of the output ports, and in a third position there is a signal at only the other output port.

BRIEF DESCRIPTION OF THE DRAWING

FIG. 1 is a longitudinal central section through the subject of the invention with the parts disposed in their normal positions;

FIG. 2 is a like section with the parts disposed in an alarm position;

FIG. 3 is a like section with the parts disposed in an acknowledge position; and FIG. 4 is a chart of the logic functions performed in FIGS. 1 to 3.

DESCRIPTION OF THE PREFERRED EMBODIMENT

Referring now to the drawing, and first to FIG. 1, valve body 10 is provided with a bore 12, closed at one end by a suitable plug 14, illustrated as a plug with a peripheral static O-ring 16 and retained in the bore by a snap ring 18. A piston 20, sealed by an O-ring 22, is slideable in the bore and normally retained in the position illustrated by control pressure applied through Port A. An axially aligned bore 24, of a diameter smaller than bore 12, contains a piston 26, forming an integral part of piston 20 which, in the position shown, has isolated Port B from supply in Port D. Bore 24 also contains a piston 28 having an exposed button portion E which may be manually depressed for a purpose to subsequently be described. As shown, piston 28 now isolates Port C from Port D. Assuming that the control pressure at Port A is the same as the supply pressure at Port D, the pistons remain in the position shown since the total pressure on piston 20 exceeds the total pressure on the end of piston 26. Piston 28 and Button E are also urged to the position shown, a suitable stop pin 30 limiting the movement. While in this position, the control pressure at Port A energizes a green light G by any suitable type of pressure-responsive switch (not shown), indicating that the system is operating normally.

Referring now to FIG. 2, and assuming that the control pressure at Port A is lost or decays sufficiently, supply pressure at Port D now moves piston 20 (including section 26 thereof) to its left limit position uncovering Port B and establishing a signal pressure thereat equal to the supply pressure at Port D as indicated by the arrow. Through like pressure-responsive devices a horn H is activated and a red light R energized. The horn audibly alerts the operator and the red light visually alerts him that the control pressure at Port A has decayed to an alarm level.

Referring now to FIG. 3, the operator now depresses Button E to the position shown, disestablishing communication between Port D and Port B which inactivates the horn H and red light R, by loss of pressure through a bleed port (not shown), and at the same time establishes communication between Port D and Port C as indicated by the arrow which energizes an amber light A, which is a signal indicating that the operator has acknowledged the horn and red light signals and is aware that the control pressure at Port A has decayed or been lost. As will be apparent, piston 28 is in the form of a balanced pressure spool valve and remains in the position of FIG. 3 when the depressing pressure on Button E is released. When corrective measures are taken to resume normal control pressure at Port A, the pistons return to their normal positions of FIG. 1.

FIG. 1 illustrates a preferred mode of securing the device to a panel 32, having a circular hole in same, body 10 being provided with a threaded projection 34 having nuts 36 on same engaging opposite faces of the panel.

FIG. 4, which is self-explanatory, summarizes the operations of FIGS. 1 to 3 in Yes-No logic of information present at the various parts of the device.

Obviously many modifications and variations of the present invention are possible in the light of the above teachings. It is therefore to be understood that within the scope of the appended claims the invention may be practiced otherwise than as specifically described.

I claim:

1. A valve device for detecting decay of a control pressure, comprising:
    a. a valve body,
    b. a piston slideable in the valve body between a normal position and a second position,
    c. the piston having one end in constant communication with an input control pressure port and an opposite end in communication with an input supply pressure port, the areas of said ends being so proportioned to urge the piston to its normal position when the control pressure is above a predetermined value,
    d. a first output port adapted to be isolated from the supply port when the piston is in its normal position and to communicate with the supply port when the piston moves to its second position.
    e. a valve member slideable in the valve body between a normal position and a second position,
    f. the valve member having a head end in communication with the supply port when it is disposed in its normal position, and a channel in same for communicating the supply port with a second output port only when it is moved to its second position, g. the construction and arrangement being such that after said piston moves to its second position, movement of the valve member to its second position disestablishes communication between the supply port and first output port and establishes communication between the supply port and the second output port, and resumption of control pressure to a predetermined value returns the piston and valve member to their normal positions.

2. A device in accordance with claim 1 including a first alarm signal apparatus operatively connected to the first output port, and a second signal apparatus operatively connected to the second output port for acknowledging receipt, by an operator, of the alarm signal.

3. A device in accordance with claim 2 wherein the alarm signal apparatus includes an audible alarm device, such as an annunciator.

4. A device in accordance with claim 3 including a green light adapted to be illuminated only when the piston is disposed at its normal position, a red light adapted to be illuminated only when the piston moves to its second position, and an amber light adapted to be illuminated only when the valve member is moved to its second position.

5. A device in accordance with claim 1 wherein said valve member is a spool-type valve, said channel being an annular space between its ends, one end of the valve member normally projecting from the valve body and adapted to be manually depressed to its second position at which it remains, upon removal of a depressing force, until control pressure is resumed to a predetermined value.

6. A device in accordance with claim 5 wherein the projecting end of the valve member moves to the second position at which it is inaccessible to an operator to return it to its normal position.

7. A device in accordance with claim 1 wherein said one end of the piston is of greater area than said opposite end, and the control pressure is normally substantially the same as the supply pressure, whereby the piston is moved to its normal position by a force applied to the differential area of its ends.

8. A device in accordance with claim 1 wherein said valve body is provided with a threaded end adapted to be secured to an aperture in a panel.